United States Patent [19]
Katsuoka et al.

[11] Patent Number: 6,075,080
[45] Date of Patent: Jun. 13, 2000

[54] FLUX COMPOSITION

[75] Inventors: Ritsu Katsuoka; Naoyasu Udono, both of Kobe; Takashi Shibuya, Yokosuka; Koichi Sekiguchi, Asaka; Kenji Matsui, Kitamoto, all of Japan

[73] Assignee: Fujitsu Ten Limited, Kobe, Japan

[21] Appl. No.: 09/070,471

[22] Filed: Apr. 30, 1998

[30] Foreign Application Priority Data

Sep. 8, 1997 [JP] Japan .................................. 9-257920

[51] Int. Cl.$^7$ ............................. C08L 93/04; C08L 77/00
[52] U.S. Cl. ......................... 524/272; 524/602; 524/606
[58] Field of Search ................................. 524/272, 602, 524/606, 607

[56] References Cited

U.S. PATENT DOCUMENTS

| | | | |
|---|---|---|---|
| 4,066,585 | 1/1978 | Schepp et al. | 524/602 |
| 4,181,775 | 1/1980 | Corke | 524/602 |
| 4,237,036 | 12/1980 | Goodrich | 528/76 |
| 4,251,276 | 2/1981 | Ferree, Jr. et al. | 524/602 |
| 4,284,542 | 8/1981 | Boyce et al. | 524/140 |
| 4,424,239 | 1/1984 | Nota et al. | 524/540 |
| 4,602,058 | 7/1986 | Graham et al. | 524/514 |
| 5,162,490 | 11/1992 | Drawert et al. | 524/607 |
| 5,346,936 | 9/1994 | Buehler et al. | 524/47 |
| 5,420,229 | 5/1995 | Burke et al. | 524/600 |
| 5,436,078 | 7/1995 | Bühler et al. | 524/47 |

FOREIGN PATENT DOCUMENTS

| | | |
|---|---|---|
| 7-144292 | 6/1995 | Japan . |
| 7-144293 | 6/1995 | Japan . |
| 8-71787 | 3/1996 | Japan . |
| 8-197282 | 8/1996 | Japan . |
| 9-24488 | 1/1997 | Japan . |

OTHER PUBLICATIONS

Grant & Hackh's Chemical Dictionary, Fifth Edition, p. 241, 1984.

*Primary Examiner*—Peter A. Szekely
*Attorney, Agent, or Firm*—Christie, Parker & Hale, LLP

[57] ABSTRACT

By addition of a polyamide resin, which is compatible with rosin-based resins as the main components of liquid flux and solder paste flux, which is resistant to temperature variation and provides a damp proofing effect, and particularly a polyamide resin which is obtained by polycondensation reaction of a dicarboxylic acid of 2 to 21 carbon atoms and a diamine and has a softening point of 80° to 150° C., or a polyamide resin which is obtained by polycondensation reaction of a dimer acid and a diamine and has a softening point of 80° to 150° C., highly reliable low-viscosity liquid fluxes and solder paste fluxes, with which solderability is not impaired, where the flux residues on printed circuit boards after soldering undergoes no cracking or deterioration even under temperature variation, and which prevent poor insulation and migration even under high humidity environment, are provided.

8 Claims, No Drawings

FLUX COMPOSITION

BACKGROUND OF THE INVENTION

1. Field of the Invention

The present invention relates to a flux composition, for a liquid flux and a solder paste, used for soldering electronic parts onto printed circuit boards.

2. Description of the Related Art

The fluxes used for soldering electronic parts and the like onto printed circuit boards include liquid types used for coating printed circuit boards by foam systems or spray systems, and paste fluxes used as solder paste in admixture with solder powder.

A conventional liquid flux is composed mainly of rosin-based resins, and is prepared by adding an activating agent such as an amine-hydrogen halide acid salt and an organic acid for increased activating power, as well as a delusterant to eliminate gloss on the solder surface after soldering, and then dissolving the mixture in a lower alcohol such as isopropyl alcohol (IPA).

A flux for solder paste is composed mainly of rosin-based resins, and is prepared by adding an activating agent, as well as a wax to give a paste, and then dissolving the mixture in a solvent with a boiling point of 200° to 300° C. to form a paste.

With the current total ban on freon (fluorocarbon, chlorofluorocarbon and the like), and the failure to develop a detergent with the same or better detergency as freon without environmental pollution, there is an increasing trend to leave flux residues unwashed from printed circuit boards after soldering, and hence there is a growing demand for greater reliability of flux residue remaining on printed circuit boards.

The reliability of flux residue remaining on printed circuit boards is evaluated based on insulation this paper or fee is being deposited with the resistance and migration tests under high temperature and humidity, and on moisture condensation tests, and these are almost all carried out under conditions of constant temperature or low temperature variation.

Electronic devices all undergo continuous temperature variation except for those used under constant temperature conditions and, in extreme cases such as equipment in vehicles, the temperature variation may be as great as 80° C. or more. Consequently, flux residues on printed circuit boards also undergo continual temperature fluctuations, and have therefore been subject to cracking and deterioration which has resulted in impaired reliability.

It is an object of the present invention to provide a highly reliable liquid flux and solder paste flux, with which solderability is not impared, where the flux residue on printed circuit boards after soldering undergoes no cracking or deterioration even under temperature variation and which, through a damp proofing effect, prevents poor insulation and migration even under high humidity environments, as compared to conventional liquid flux and the solder paste flux commonly known as a post-flux.

SUMMARY OF THE INVENTION

As a result of research on means of solving the aforementioned problems, the present inventors have completed the present invention upon the finding that those problems can be overcome by the addition of a polyamide resin which is compatible with rosin-based resins as the main components of liquid flux and solder paste flux, which is resistant to temperature variation and provides a damp proofing effect, and particularly a polyamide resin which is obtained by a polycondensation reaction of a dicarboxylic acid of 2 to 21 carbon atoms and a diamine and has a softening point of 80° to 150° C., or a polyamide resin which is obtained by a polycondensation reaction of a dimer acid and a diamine and has a softening point of 80° to 150° C.

In other words, the present invention relates to a flux composition characterized by containing a polyamide resin, having a softening point of 80° to 150° C., particularly obtained by a polycondensation reaction of a dicarboxylic acid of 2 to 21 carbon atoms and a diamine, or a dimer acid and a diamine.

DESCRIPTION OF THE PREFERRED EMBODIMENT

Conventional liquid flux compositions are prepared by including a rosin-based resin such as gum rosin, polymer rosin or hydrogenated rosin as the main component, adding any of various types of activating agents including amine-hydrogen halide acid salts and organic acids for increasing activating power, and dissolving the mixture in a lower alcohol such as isopropyl alcohol.

Also, solder paste flux compositions are prepared by including a rosin-based resin such as gum rosin, polymer rosin or hydrogenated rosin as the main component, adding any of various types of activating agents including amine-hydrogen halide acid salts and organic acids for increasing activating power, as well as a wax of hardened caster oil or a higher fatty acid amide to form a paste, and then dissolving the mixture in a solvent, with a boiling point range of 200° to 300° C., such as diethyleneglycol monobutyl ether or diethyleneglycol monohexyl ether.

The liquid flux composition and solder paste flux composition according to the present invention each replaces a portion of the rosin-based resin portion as the main component with a polyamide resin, and contains a given amount of the polyamide resin.

Polyamide is a general term which means a compound having amide linkages (—NHCO—) along the molecular chain. It is necessary that the polyamide resin used in the present invention has a softening point of 80° to 150° C. measured by ring and ball test. This polyamide is preferably the so-called nylon type polyamide prepared by a polycondensation reaction of a dicarboxylic acid of 2 to 21 carbon atoms and a diamine or a dimer acid type polyamide prepared by a polycondensation reaction of a dimer acid and a diamine. Examples of a dicarboxylic acid of 2 to 21 carbon atoms include an aliphatic saturated dicarboxylic acid such as oxalic acid, malonic acid, succinic acid, glutaric acid, adipic acid, pimelic acid, suberic acid, azelaic acid, sebacic acid, brassylic acid, tetradecanedioic acid, octadecanedioic acid and the like, an aliphatic unsaturated dicarboxylic acid such as maleic acid, fumaric acid and the like, and an aromatic dicarboxylic acid such as phthalic acid, isophthalic acid, terephthalic acid and the like. Examples of a diamine include an aliphatic diamine such as ethylenediamine, trimethylenediamine, tetramethylenediamine, pentamethylenediamine, hexamethylenediamine, 1,7-diaminoheptane, 1,8-diaminooctane, 1,9-diaminonynane and the like and an aromatic diamine such as phenylenediamine, xylylenediamine and the like. A dimer acid is a high-molecular weight dibasic acid prepared by dimerization of unsaturated fatty acids such as linoleic acid and oleic acid. The compound represented by the following formula can be used.

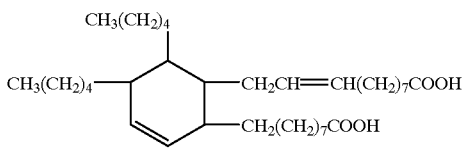

These compounds are known compounds as raw materials for preparing a polyamide. The polyamide can be prepared using a known method in the art. However, the polyamide used in the present invention should have a softening point of 80° to 150° C. and raw materials and reaction conditions should be controlled so as to achieve the above softening point in the obtained polyamide.

The reason that the polyamide used in the present invention should have a softening point of 80° to 150° C. is as follows.

Most rosin-based resins are relatively fragile resins with softening points of 70° to 150° C., and their fragility tends to be increased by the heat of soldering. For this reason they are unable to absorb warping caused by the difference in shrinkage rates of printed circuit boards and soldered joints under temperature variation, and thus suffer cracking which allows penetration of moisture from the air and is a cause of impaired reliability.

The polyamide resin according to the present invention which has a softening point of 80° to 150° C., has good compatibility with rosin-based resins, does not impair solderability, has excellent electrical characteristics and imparts suitable flexibility and humidity resistance to rosin-based resins, to provide high reliability with virtually no cracking.

Polyamide resins with softening points of lower than 80° C. result in a greasy feeling in flux residues after soldering, which not only notably reduces workability but also causes adhesion of dust, which can have an adverse effect on the reliability. If the softening point is higher than 150° C., the solderability is impaired, while the softening point of the flux residue is instead increased, thus lessening the effect of reduced cracking.

The polyamide resin content in the liquid flux is preferably from 1 wt % to 10 wt %, and that in the solder paste flux is preferably from 2 wt % to 20 wt %. With lower contents the effect is too weak, and with higher contents the activity as a flux is weakened, various problems arise with soldering and the viscosity is increased, while the residual flux on the soldered surface after soldering becomes covered, impairing the conductivity.

The present invention will now be explained by way of examples and comparative examples. Results will also be provided from tests of liquid flux and solder pastes obtained according to the examples and comparative examples.

EXAMPLES 1 TO 6

Liquid fluxes were obtained, each in an amount of 100 g, by accurately measuring out components into a 200 ml beaker, using the starting material contents shown in Table 1, and stirring was continued, until complete dissolution, at a vigor which prevented boiling over. Because 2-propanol is volatilized in small amounts during the stirring, the 2-propanol lost through volatilization was resupplied after stirring and dissolution. The polyamide resin 1 shown in Table 1 was polycondensate of dicarboxylic acid and diamine with softening point of 120° is to 130° C. The polyamide resin 2 shown in Table 1 was polycondensate of dimer acid and diamine with softening point of 105° to 110° C.

COMPARATIVE EXAMPLES 1 TO 7

Liquid fluxes were obtained, each in an amount of 100 g, in the same manner as Examples 1 to 6, using the starting material contents shown in Table 1, except that a polyamide resin was not used (Comparative Examples 1 to 3) or polyamide resin 3 which was polycondensate of dicarboxylic acid and diamine with a softening point of 160° to 170° C. or the polyamide resin 4 which was polycondensate of dimer acid and diamine with a softening point of 70° to 75° C. was used as a polyamide resin (Comparative Examples 4 to 7).

TABLE 1

Liquid flux compositions

| | Examples | | | | | | Comparative Examples | | | | | | |
|---|---|---|---|---|---|---|---|---|---|---|---|---|---|
| Component | 1 | 2 | 3 | 4 | 5 | 6 | 1 | 2 | 3 | 4 | 5 | 6 | 7 |
| Gum rosin | 8 | 10 | 8 | 8 | — | — | 12 | 10 | — | 8 | 8 | — | — |
| Polymer rosin | 1.5 | 1.5 | 2 | 2 | 1.5 | 1.5 | 3 | 3 | 2 | 1.5 | 3 | 1.5 | 2.5 |
| Hydrogenated rosin | 1.5 | 1.5 | — | — | 3.5 | 4 | 3 | — | 5 | 1.5 | — | 3.5 | 3 |
| Polyamide resin 1 | 6 | — | 3 | — | 2 | — | — | — | — | — | — | — | — |
| Polyamide resin 2 | — | 5 | — | 2.5 | — | 1.5 | — | — | — | — | — | — | — |
| Polyamide resin 3 | — | — | — | — | — | — | — | — | — | 4 | — | 2 | — |
| Polyamide resin 4 | — | — | — | — | — | — | — | — | — | — | 3 | — | 1.5 |
| n-butylamine.HBr | 0.3 | 0.3 | 0.2 | 0.2 | 0.1 | 0.1 | 0.3 | 0.2 | 0.1 | 0.3 | 0.3 | 0.1 | 0.1 |
| Palmitic acid | 2 | 2 | 1.5 | 1.5 | 1 | 1 | 2 | 1.5 | 1 | 2 | 2 | 1 | 1 |
| 2-propanol | 80.7 | 79.7 | 85.3 | 85.8 | 91.9 | 91.9 | 79.7 | 85.3 | 91.9 | 82.7 | 83.7 | 91.9 | 91.9 |

EXAMPLES 7 To 10

Solder pastes were obtained, each in an amount of 100 g, by accurately measuring out gum rosin, polymer rosin and hydrogenated rosin portions and polyamide resins into a 500 ml stainless steel beaker, using the starting material contents shown in Table 2, and diethyleneglycol monobutyl ether was then added thereto. The mixture was heated at 130° to 140° C. to dissolution. Next, there were added diphenylguanidine hydrogen bromide salt (DPG.HBr salt), adipic acid and N,N'-ethylene-bis-stearic amide, and after rapid stirring to dissolution, the heating was stopped. Any volatilized portion of diethyleneglycol monobutyl ether was resupplied at this point, and the mixture was immediately cooled with water. After cooling, soldering powder was added and the mixture was adequately stirred.

COMPARATIVE EXAMPLES 8 To 13

Solder pastes were obtained, each in an amount of 100 g, in the same manner as Examples 7 to 10, using the starting material contents shown in Table 2, except that a polyamide resin was not used (Comparative Examples 8 and 9) or polyamide resin 3 which was polycondensate of dicarboxylic acid and diamine with a softening point of 160° to 170° C. or the polyamide resin 4 which was polycondensate of dimer acid and diamine with a softening point of 70° to 75° C. was used as a polyamide resin (Comparative Examples 10 to 13)

1: The solder melted from the solder paste moistens the test plate and spreads more than the applied area.
2: All portion to which the solder paste was applied was moistened by the solder.
3: Most of the portion to which the solder paste was applied was moistened by the solder.
4: The test plate was not moistened by the solder, the melted solder was present as one or more solder balls.

TABLE 2

Solder paste compositions

| Component | Examples | | | | Comparative Examples | | | | | |
|---|---|---|---|---|---|---|---|---|---|---|
| | 7 | 8 | 9 | 10 | 8 | 9 | 10 | 11 | 12 | 13 |
| Gum rosin | 15 | 18 | — | — | 25 | — | 18 | 20 | — | — |
| Polymer rosin | 10 | 10 | 12 | 12 | 15 | 15 | 10 | 13 | 10 | 14 |
| Hydrogenated rosin | 10 | 10 | 17 | 20 | 10 | 20 | 10 | 10 | 18 | 18 |
| Polyamide resin 1 | 15 | — | 6 | — | — | — | — | — | — | — |
| Polyamide resin 2 | — | 12 | — | 3 | — | — | — | — | — | — |
| Polyamide resin 3 | — | — | — | — | — | — | 12 | — | 7 | — |
| Polyamide resin 4 | — | — | — | — | — | — | — | 7 | — | 3 |
| DPG.HBr | 1.5 | 1.5 | 0.5 | 0.5 | 1.5 | 0.5 | 1.5 | 1.5 | 0.5 | 0.5 |
| Adipic acid | 1 | 1 | 0.5 | 0.5 | 1 | 0.5 | 1 | 1 | 0.5 | 0.5 |
| N,N'-ethylene-bis-stearamide | 5 | 5 | 6 | 6 | 5 | 6 | 5 | 5 | 6 | 6 |
| Diethyleneglycol monobuthyl ether | 42.5 | 42.5 | 58 | 58 | 42.5 | 58 | 42.5 | 42.5 | 58 | 58 |
| Soldering powder | 900 | 900 | 900 | 900 | 900 | 900 | 900 | 900 | 900 | 900 |

The liquid flux and solder pastes obtained in the above examples and comparative examples were subjected to a solder spread test, temperature cycle test, voltage applied damp proof test and migration test, according to the methods described below. The solder powder used for the solder paste was tin-lead eutectic solder, with a particle size of 20 to 40 μm.

(1) Solder spread test

This test was conducted according to JIS Z 3197 for the liquid flux. An amount of liquid flux was placed on a copper plate which was washed previously and heated by suitable heating means to spread the flux over the copper plate. After cooling, the spread area was calculated in accordance with the following formula:

$$\text{Spread Rate (\%)} = \frac{D - H}{D} \times 100$$

H: a height of spread flux (mm)
D: a diameter of flux if the flux is considered spherical (mm)
$D = 1.24 V^{1/3}$
V: weight/specific gravity In this test, the evaluation was made as follows:
○: solder spread rate of 85% or greater
Δ: solder spread rate of at least 70% and less than 85%
x. solder spread rate of less than 70%

This test was conducted according to JIS Z 3284, Appendix 10 for the solder paste. A metal mask was placed on a test plate which was washed previously, and solder paste was applied on the metal mask to fill holes of the metal mask. After removing the metal mask, the test plate was heated and this heating was stopped at five seconds after the solder melted. The solder was cooled in a horizontal position and the degree of spread of the solder was examined. This degree of spread was shown in accordance with the following classification.

In this test, Examples 5, 6, 9, and 10, and Comparative Examples 3, 5, 6, 7, 12, and 13 were tested out in a nitrogen atmosphere (oxygen concentration: no greater than 500 ppm).

The test results are listed in Table 3.

(2) Temperature cycle test

For liquid flux, a type 1 comb-shaped electrode such as indicated in JIS Z 3197 was used for application to an application thickness of 5 μm and, after soldering the flux was exposed to a temperature cycle with a thermal shock tester and the presence or absence of cracking in the flux residue was observed. For the solder paste, printing with a 0.2 mm-thick metal mask and reflow were followed by exposure to a temperature cycle with a thermal shock tester, after which the presence or absence of cracking in the flux residue was observed.

For the test, 100 comb-shaped electrodes were used for each sample, and the number of cracks in the surface of a 1×1 cm square center section of each comb-shaped electrode was counted to calculate the cracking incidence rate in terms of the comb-shaped electrode units.

The reflow was carried out in air and a nitrogen atmosphere (oxygen concentration; 500 ppm or lower) in a warm air/far-infrared heating reflow apparatus.

The soldering conditions for the liquid flux were: preheating at 120° to 130° C. for about 30 seconds, and flow soldering at a soldering temperature of 250°±5° C.

The reflow conditions for the solder paste were; preheating at 150° to 160° C. for 60 to 80 seconds, and main heating at 200° C. or higher for 30 seconds.

The temperature cycle conditions were: 500 cycles, one cycle=−30° C. to 80° C. (about 10 minutes).

The test results are shown in Table 3.

(3) Voltage applied damp proof test

For liquid flux, a type 2 comb-shaped electrode such as indicated in JIS Z 3197 was used, and the test was conducted according to JIS Z 3197 for samples soldered under the soldering conditions for the above temperature cycle test (2), and subjected to the temperature cycle test. The test sample was placed in a constant temperature and humidity bath set at a temperature of 60°±2° C. and relative humidity of 90% to 95%, and direct current of 100 v was applied between the electrodes. After 1000 hours, the resistance was measured at direct current of 100 v. The test results are shown in Table 4.

(4) Migration test

This was conducted for the solder pastes, according to JIS Z 3284, Appendix 14. Solder was melted under the above reflow conditions, and 45 to 50 volts was applied between the electrodes. Then, the test sample was placed in a constant temperature and humidity bath set at a temperature of 80°±2° C. and relative humidity of 85% to 90%. After 1000 hours, a magnifying glass was used for observation. If resinoid metal was observed from the one electrode to other electrode, migration was deemed occurred. The test results are shown in Table 5.

TABLE 3

Solder spread and temperature cycle test results

| | | Solder spread | Cracking incidence (%) | | |
|---|---|---|---|---|---|
| | | | No cracking | Slight cracking | Large cracking with peeling |
| Example | 1 | o | 32 | 59 | 9 |
| | 2 | o | 28 | 57 | 15 |
| | 3 | o | 24 | 60 | 16 |
| | 4 | o | 22 | 51 | 27 |
| | 5 | o | 33 | 60 | 7 |
| | 6 | o | 30 | 55 | 15 |
| Comparative Example | 1 | o | 0 | 0 | 100 |
| | 2 | o | 0 | 0 | 100 |
| | 3 | o | 0 | 0 | 100 |
| | 4 | o | 3 | 66 | 31 |
| | 5 | o | 38 | 53 | 9 |
| | 6 | o | 8 | 68 | 24 |
| | 7 | o | 35 | 57 | 8 |
| Example | 7 | 1 | 27 | 58 | 15 |
| | 8 | 2 | 26 | 55 | 19 |
| | 9 | 1 | 21 | 53 | 26 |
| | 10 | 1 | 20 | 51 | 29 |
| Comparative Example | 8 | 1 | 0 | 0 | 100 |
| | 9 | 1 | 0 | 0 | 100 |
| | 10 | 2 | 6 | 61 | 33 |
| | 11 | 1 | 28 | 59 | 13 |
| | 12 | 1 | 2 | 46 | 52 |
| | 13 | 1 | 22 | 57 | 21 |

TABLE 4

Voltage applied damp proof test results
units: Ω

| | | Before humidification | After humidification | Corrosion |
|---|---|---|---|---|
| Example | 1 | $1.1 \times 10^{14}$ | $7.5 \times 10^{11}$ | none |
| | 2 | $1.5 \times 10^{14}$ | $6.5 \times 10^{11}$ | none |
| | 3 | $8.8 \times 10^{13}$ | $5.9 \times 10^{11}$ | none |
| | 4 | $1.2 \times 10^{14}$ | $7.0 \times 10^{11}$ | none |
| | 5 | $1.0 \times 10^{14}$ | $9.0 \times 10^{11}$ | none |
| | 6 | $2.0 \times 10^{14}$ | $1.5 \times 10^{12}$ | none |
| Comparative Example | 1 | $6.6 \times 10^{13}$ | $3.8 \times 10^{11}$ | none |
| | 2 | $7.8 \times 10^{13}$ | $4.7 \times 10^{11}$ | none |
| | 3 | $4.8 \times 10^{13}$ | $2.0 \times 10^{11}$ | none |
| | 4 | $1.1 \times 10^{14}$ | $6.8 \times 10^{11}$ | none |
| | 5 | $2.5 \times 10^{14}$ | $3.6 \times 10^{10}$ | none |

TABLE 4-continued

Voltage applied damp proof test results
units: Ω

| | | Before humidification | After humidification | Corrosion |
|---|---|---|---|---|
| | 6 | $1.4 \times 10^{14}$ | $7.0 \times 10^{11}$ | none |
| | 7 | $1.5 \times 10^{14}$ | $8.0 \times 10^{10}$ | none |

TABLE 5

Migration test results
units: Ω

| | | Before humidification | After humidification | Corrosion |
|---|---|---|---|---|
| Example | 7 | $9.5 \times 10^{13}$ | $7.5 \times 10^{11}$ | none |
| | 8 | $1.5 \times 10^{14}$ | $1.0 \times 10^{12}$ | none |
| | 9 | $1.5 \times 10^{14}$ | $2.5 \times 10^{12}$ | none |
| | 10 | $1.0 \times 10^{14}$ | $1.5 \times 10^{12}$ | none |
| Comparative Example | 8 | $4.6 \times 10^{13}$ | $1.5 \times 10^{11}$ | none |
| | 9 | $6.0 \times 10^{13}$ | $2.0 \times 10^{11}$ | none |
| | 10 | $3.8 \times 10^{14}$ | $9.5 \times 10^{11}$ | none |
| | 11 | $5.5 \times 10^{13}$ | $7.8 \times 10^{10}$ | none |
| | 12 | $2.0 \times 10^{14}$ | $1.2 \times 10^{12}$ | none |
| | 13 | $9.0 \times 10^{13}$ | $1.0 \times 10^{11}$ | none |

From the results shown in Table 3, good results were achieved for solder spreading in the Examples and the Comparative Examples. However, a large amount of cracking was observed in Comparative Examples 1 to 3 and 8 to 9 which does not contain polyamide resin. The cracking incidence in Comparative Examples 4 to 7 and 10 to 13 is similar to that of the Examples, but a greasy feeling appeared on the flux residues. From the results shown in Tables 4 and 5, the flux composition of the 10 present invention prevents poor insulation and migration even in high humidity environments.

What is claimed is:

1. A soldering flux composition comprising;
a rosin-based resin and an activating agent, characterized in that a polyamide resin having a softening point of 80° to 150° C. is included as a partial replacement of the rosin-based resin.

2. The solder flux composition according to claim 1 characterized in that said polyamide resin is obtained by a polycondensation reaction of a dicarboxylic acid of 2 to 21 carbon atoms and a diamine.

3. The solder flux composition according to claim 1 characterized in that said polyamide resin is obtained by a polycondensation reaction of a dimer acid and a diamine.

4. The solder flux composition according to claim 1 characterized in that said solder flux composition is liquid flux.

5. The solder flux composition according to claim 4 characterized in that the contents of the polyamide is 1 to 10 wt % based on the total weight of the composition.

6. The solder flux composition according to claim 1 characterized in that said solder flux composition is solder paste.

7. The solder flux composition according to claim 6 characterized in that the contents of the polyamide is 2 to 20 wt % based on the total weight of the composition.

8. The solder flux composition according to claim 1 characterized in that said softening point of the polyamide is 105° to 130° C.

* * * * *